Figure 1:
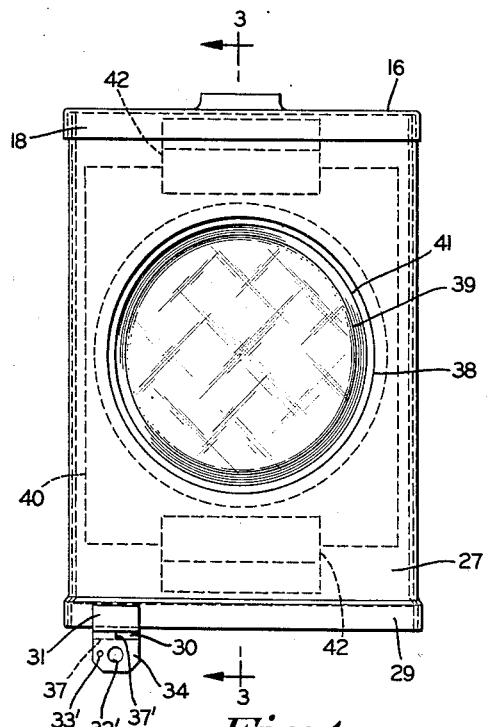

Feb. 4, 1958  C. M. MATHISON  2,822,417
COVER WITH SLIDABLE INSERT FOR SOCKET METER ENCLOSURES
Filed Jan. 5, 1955  2 Sheets-Sheet 1

INVENTOR.
Charles M. Mathison
BY
Frease & Bishop
ATTORNEYS

Feb. 4, 1958          C. M. MATHISON          2,822,417

COVER WITH SLIDABLE INSERT FOR SOCKET METER ENCLOSURES

Filed Jan. 5, 1955          2 Sheets-Sheet 2

INVENTOR.
*Charles M. Mathison*
BY
*Frease & Bishop*
ATTORNEYS

United States Patent Office 2,822,417
Patented Feb. 4, 1958

2,822,417

COVER WITH SLIDABLE INSERT FOR SOCKET METER ENCLOSURES

Charles M. Mathison, Canton, Ohio, assignor to The Superior Switchboard & Devices Company, Canton, Ohio, a corporation of Ohio Application January 5, 1955, Serial No. 479,966

3 Claims. (Cl. 174—52)

The invention relates to covers for enclosures for socket type meters, and more particularly to such a cover having a circular opening therein of slightly greater diameter than the meter, and provided with a slidable insert having an opening of the exact size of the meter, whereby, when the meter is inserted through the opening in said slidable plate and electrically connected to the conductors in the enclosure, the cover may be slidably moved into closed position without disturbing the meter.

Meter enclosures of the general type to which the invention pertains, comprise generally a sheet metal box, usually of rectangular shape, having terminal jaws or clips mounted therein, upon insulation bases, for receiving the terminal posts of the meter, and a detachable cover for the box or enclosure having a circular opening for mounting the meter thereon.

Under present practice, the cover for such enclosures is adapted to be slidably moved into closed position upon the box or enclosure, after which the cover is locked in closed position upon the box.

It is also common practice to provide an integral flanged ring surrounding the circular opening in the cover, the base of the meter seating upon said flanged ring and being secured thereto by a sealing ring. Such sealing rings are objectionable, not only because they require a separable part and an additional operation to secure the meter to the cover, but also because in many cases they do not provide a satisfactory seal between the meter base and the cover.

It is therefore an object of the present invention to provide a cover for meter enclosures which eliminates the requirement of a sealing ring for securing the meter to the cover.

Another object is to provide such a cover which eliminates the flanged ring surrounding the circular opening in the cover.

A further object is to provide a meter closure cover of the character referred to which is provided with a sliding insert having a circular opening through which the meter is located.

A still further object is to provide such a cover for meter closures in which the cover secures the meter in position and prevents removal of the meter while the cover is secured in closed position upon the box.

Another object of the invention is to provide a meter closure cover of this character adapted to be slidably moved into closed position upon the box and having a circular opening therein of slightly greater diameter than the meter, an insert plate being slidably mounted upon the underside of the cover and provided with a circular opening of the same diameter as the meter.

A still further object is to provide such a meter enclosure cover with external means for locking the cover upon the box, after the cover has been slidably moved to closed position thereon.

The above objects together with others which will be apparent from the drawings and following description, or which may be later pointed out, may be attained by constructing the improved socket meter enclosure cover with slidable insert in the manner illustrated in the drawings and hereinafter described in detail.

The invention may be briefly described in general terms as including a meter enclosure or box having terminal jaws therein for receiving the terminal posts of a watt-hour meter or the like, the box being open on its top or front side and having a flange overhanging one end of the open side of the box. The cover may be in the form of a metal sheet or plate adapted to fit over the open side of the box, one edge of said cover being slidably insertable beneath said overhanging flange and having therein a circular opening of slightly greater diameter than the meter, angular flanges being provided upon the other three edges of the cover for fitting over the adjacent side walls of the box.

A slidable insert in the form of a flat plate, with a circular opening of the same diameter as the meter, is slidably mounted upon the underside of the cover, as by guide members attached to the cover. External locking means is provided for locking the cover in closed position upon the box.

In the operation of the device thus briefly described, the circular glass case of the meter is inserted through the circular opening in the slidable insert, from the underside of the cover, the enlarged base of the meter being positioned against the underside of said insert, with a rubber gasket interposed therebetween.

The cover is then placed over the open side of the box and the usual terminal posts of the meter are inserted into the terminal jaws in the box. The cover may then be slidably moved upon the box to engage one edge thereof under the overhanging flange on one end of the box, the slidable insert remaining stationary while the cover itself is slidably moved relative thereto, after which the conventional locking or latching means is operated to lock the other end of the cover to the box.

Figure 2:
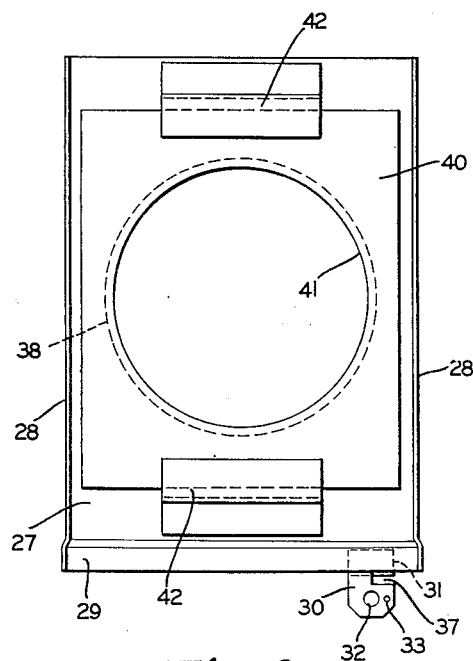
Figure 3:
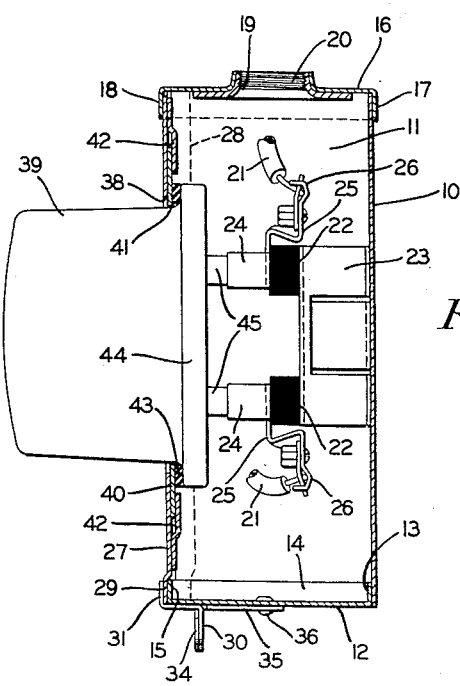
Figure 6:
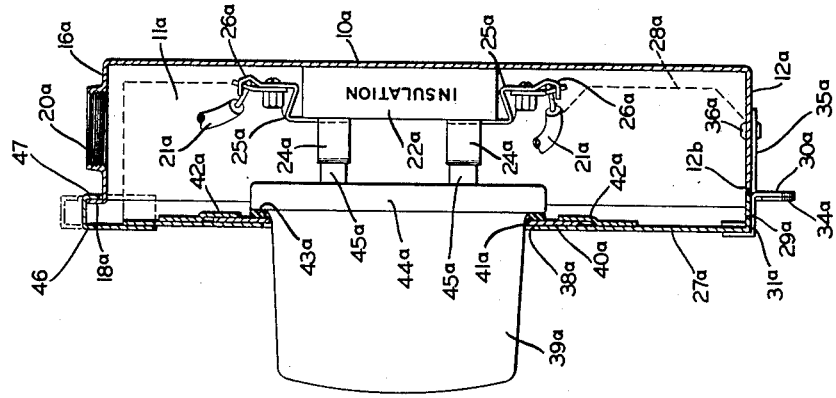
Figure 5:
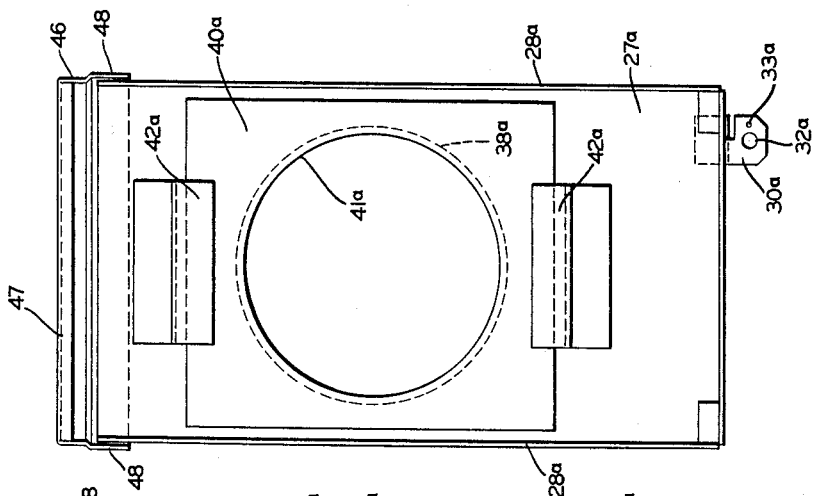
Figure 4:
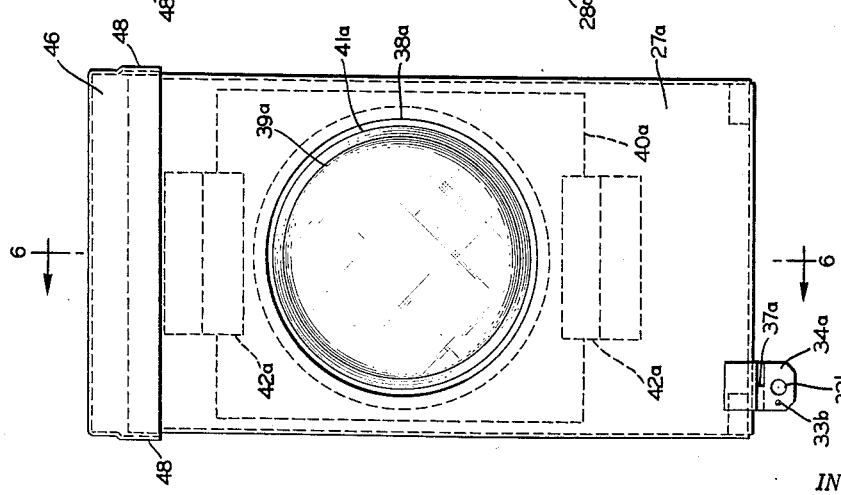

Having thus briefly described the invention, reference is now made to the accompanying drawings, showing preferred embodiments of the invention, in which:

Fig. 1 is a front elevation of a socket meter box provided with the improved cover with slidable insert thereon, showing a meter mounted upon the box;

Fig. 2 an elevation of the inner or underside of the cover, showing the slidable insert plate;

Fig. 3 a longitudinal, sectional view through the box with the cover thereon and a meter mounted through the slidable insert plate, taken as on the line 3—3, Fig. 1;

Fig. 4 a front elevation of a slightly modified form of meter enclosure with the improved cover thereon and a meter mounted through the cover;

Fig. 5 an elevation of the inner side of the cover shown in Fig. 4, showing the slidable insert plate thereon; and, Fig. 6 a longitudinal, sectional view through the meter enclosure with cover thereon and meter mounted through the opening in the slidable insert plate, taken as on the line 6—6, Fig. 4.

Referring first to the embodiment of the invention shown in Figs. 1 to 3, in which similar numerals refer to similar parts throughout, a conventional form of socket meter box is shown, formed of sheet metal and comprising the back wall 10, side walls 11 which may be formed integrally therewith, the inserted bottom wall 12 which may have upturned angular flanges 13 and 14 for connection to the back and side walls respectively, as by welding or the like, and a similar upturned angular flange 15 against which one end of the cover may rest as will be later described.

The box also includes the top wall 16, having downturned angular flanges 17 welded or otherwise connected to the back and side walls of the box and a similar down-turned flange 18 overhanging the open front side of the box.

The top wall is provided with the usual center opening 19 surrounded by the upwardly disposed, internally threaded opening 20 for connection of a conventional conduit through which cables or wires 21 may be disposed for connection to suitable terminal clips or the like on the interior of the box.

As in usual practice in socket type meter enclosures of this particular construction, a pair of insulation blocks 22 are located within the box, being shown as mounted upon a bracket 23 attached to the back wall 10 of the box.

Upon each insulation block 22 may be mounted spaced pairs of terminal jaws 24, of usual and well known construction, each having terminal clips 25 integrally connected thereto or formed thereon for attachment to the wires 21, as by the connections 26 of conventional construction.

It should be understood that this meter enclosure itself and the devices mounted therein may be of any conventional construction and in themselves form no part of the invention which resides entirely in the novel construction of cover for the enclosure or box.

This cover is in the form of a rectangular metal sheet or plate 27 having angular rearwardly disposed flanges 28 at opposite sides for engagement over the adjacent edge portions of the side walls 11 of the box, as in usual and well known manner, the lower end of the cover being outwardly offset, as indicated at 29, for engaging over the upturned front flange 15 of the bottom wall of the box.

For the purpose of securing the cover to the box, an angular depending, stationary hasp 30, having an integral angular bracket portion 31, is attached to the outwardly offset lower portion 29 of the cover, preferably near one side thereof. This stationary hasp has a relatively large opening 32 therein to receive a lock or the like and a relatively small opening 33 for receiving the usual wire seal, as in usual and well known manner.

Cooperating with the stationary hasp 30 is a rotary hasp 34 having the angular horizontal arm 35 pivotally connected to the bottom wall of the box as by the rivet 36. The rotary hasp 34 is suitably notched as at 37' to engage the notch 37 of the stationary hasp 30 and is provided with relatively large apertures 32' for receiving the lock and relatively small aperture 33' for receiving the wire seal.

A circular aperture 38, of slightly larger diameter than the usual glass case 39 of the conventional socket type meter, is substantially centrally formed in the cover 27. Slidably mounted upon the inner side of the cover is the insert plate 40 which is in the form of a flat sheet of metal having a circular opening 41 therein of substantially the same diameter as the case 39 of the meter.

This insert plate is mounted for vertical sliding movement upon the inner side of the cover 27 by means of a pair of angular guide members 42 welded or otherwise attached to the inner side of the cover 27 near the upper and lower ends thereof, the upper and lower end portions of the insert plate 41 being slidably received between the guide members and the inner surface of the cover.

In the operation of the improved cover, for the purpose of mounting a socket type meter upon the box, with the cover removed from the box the substantially cylindrical case 39 of the meter is inserted through the circular opening 41 of the insert plate, from the rear or inner side of the cover.

A rubber gasket 43 is located around the meter casing 39, against the front or outer surface of the enlarged base 44 of the meter, and the meter is pushed forwardly through the opening 41 so that the gasket 43 forms a seal around the meter case at the opening 41.

The cover is then placed against the open side of the box, the usual terminal posts 45 of the meter being inserted into the contact jaws 24 in the box. The cover is then slidably moved upwardly upon the box, engaging the upper edge of the cover under the overhanging flange 18 of the box, thus attaching the upper end of the cover to the box.

The rotary hasp 34 is then moved to locked position relative to the stationary hasp 30, as shown in Fig. 3, thus locking the cover upon the box, after which the usual lock and wire seal may be attached to the hasps, through the apertures therein.

It will be seen that by providing this slidable insert plate upon the inner side of the cover, with the circular opening therein adapted to fit around the case of the meter, the meter may be properly positioned relative to the box and the terminal posts thereof attached to the contact jaws 24, after which the upwardly sliding movement of the cover does not disturb the meter, which remains in position while the cover slides relative thereto, the larger opening 38 in the cover permitting of this sliding movement of the cover without movement of the meter.

Thus it will be obvious that the usual ring flange surrounding the opening in the cover is dispensed with, together with the usual channel section sealing ring, thus eliminating the disadvantages and objections inherent in such construction, and providing a simple and effective means for mounting a socket meter upon an enclosure of the general type referred to, and providing an efficient seal between the meter and the cover of the enclosure.

Referring now to the construction shown in Figs. 4, 5 and 6, another embodiment of the invention is illustrated as applied to a somewhat different type of socket meter enclosure or box, in which the general principle is the same as illustrated and described in Figs. 1 to 3, the cover being slightly modified to conform to the construction of the modified form of meter enclosure.

In this embodiment of the invention, the meter enclosure is formed of sheet metal in the form of a substantially rectangular, elongated box, comprising the back wall 10a, with integral side walls 11a, bottom wall 12a and top wall 16a, all of which may be formed by bending a single metal sheet to produce the desired shape of box.

The lower end of the cover is provided with the inwardly or rearwardly disposed angular flange 29a, of sufficient depth to substantially abut the outer edge 12b of the relatively short bottom wall 12a of the box.

A channel shaped member 46, with a depending flange 47, may be formed upon or attached to the upper end of the cover 27 and may be outwardly offset at each side as indicated at 48. Otherwise the cover is substantially the same as the cover shown in Figs. 1 to 3 and described above, and comprises the sliding insert plate 40a, slidable within the spaced guide members 42a, welded or otherwise attached to the inner surface of the cover near the upper and lower ends thereof.

The insert plate 40a is provided with the substantially central, circular opening 41a, of the same diameter as the casing 39a of the meter, and adapted to register with the slightly larger opening 38a in the cover 27a.

An angular depending, stationary hasp 30a, having an integral angular bracket portion 31a, is attached to the lower end of the cover 27a, preferably near one side thereof and is provided with the relatively large opening 32a to receive a lock or the like and the relatively small opening 33a to receive the usual wire seal.

A rotary hasp 34a cooperates with the stationary hasp 30a and is provided with the angular, horizontal arm 35a, pivotally connected to the bottom wall of the box, as by the rivet 36a. This rotary hasp may be suitably notched, as at 37a, to engage the notch 38a of the stationary hasp 30a, and is provided with the relatively large aperture 32b and small aperture 33b for receiving the usual lock and wire seal respectively, as above described.

In the operation of this embodiment of the cover, for the purpose of mounting a socket meter upon the box, with the cover removed from the box, the substantially cylindrical case 39a of the meter is inserted through the circular opening 41a of the insert plate 40a, from the rear or inner side of the cover.

A rubber gasket 43a is located against the front or outer surface of the base 44a of the meter, and the meter is pushed forwardly through the opening 41a so that the gasket 43a forms a seal around the meter case at the opening 41a.

The cover is then placed against the open side of the box, the terminal posts 45a of the meter being inserted into the contact jaws 24a in the box. With the meter and insert plate 40a remaining in the stationary position, the cover 27a may be slidably moved upward, to the position shown in broken lines in Fig. 6, and then pressed slightly rearward and slidably moved downward to engage the depending flange 47 behind the upstanding angular flange 18a of the box, the cover then being in the full line position shown in Fig. 6.

The rotary hasp 34a may then be swung upon its pivot to engage the stationary hasp 30a, and the conventional lock and wire seal may be attached thereto, locking the box in closed position with the meter mounted and sealed therein.

In the foregoing description, certain terms have been used for brevity, clearness and understanding, but no unnecessary limitations are to be implied therefrom beyond the requirements of the prior art, because such words are used for descriptive purposes herein and are intended to be broadly construed.

Moreover, the embodiments of the improved construction illustrated and described herein are by way of example, and the scope of the present invention is not limited to the exact details of construction.

Having now described the invention or discovery, the construction, the operation, and use of preferred embodiments thereof, and the advantageous new and useful results obtained thereby; the new and useful construction, and reasonable mechanical equivalents thereof obvious to those skilled in the art, are set forth in the appended claims.

I claim:

1. In combination with an enclosure for a socket meter, said enclosure having an open front side with an angular flange overhanging the upper end thereof, a cover for the open side of the enclosure, said cover being in the form of a flat sheet of such size and shape as to completely cover the open front side of said enclosure, the upper end of said cover being engaged under said overhanging flange of the enclosure, means for attaching the lower end of the cover to the enclosure, there being a circular opening in the cover of larger diameter than the socket meter, and an insert plate slidably mounted upon the inner side of the cover and having a circular opening therein of the same diameter as the socket meter, whereby the cover may be placed upon the enclosure by positioning the cover in a plane parallel to the open front side of the enclosure with the meter inserted through the circular opening in the insert plate, and the upper edge of the opening in the cover in close proximity to the meter, then moving the cover flat against the open front side of the enclosure, then sliding the cover upwardly relative to the sliding insert, upon the open front side of the enclosure to engage the upper end of the cover under said overhanging flange so that the cover closes the entire open front side of the enclosure and the sliding insert snugly engages the meter and closes the opening in the cover around the meter, and then attaching the lower end of the cover to the enclosure.

2. In combination with an enclosure for a socket meter having an enlarged base with a gasket thereon surrounding the socket meter, said enclosure having an open front side with an angular flange overhanging the upper end thereof, a cover for the open side of the enclosure, said cover being in the form of a flat sheet of such size and shape as to completely cover the open front side of said enclosure, the upper end of said cover being engaged under said overhanging flange of the enclosure, means for attaching the lower end of the cover to the enclosure, there being a circular opening in the cover of larger diameter than the socket meter, and an insert plate in the form of a flat sheet slidably mounted upon the inner side of the cover and having a circular opening therein of the same diameter as the socket meter, whereby the cover may be placed upon the enclosure by positioning the cover in a plane parallel to the open front side of the enclosure with the meter inserted through the circular opening in the insert plate, and the upper edge of the opening in the cover in close proximity to the meter, then moving the cover flat against the open front side of the enclosure, then sliding the cover upwardly relative to the sliding insert, upon the open front side of the enclosure to engage the upper end of the cover under said overhanging flange so that the cover closes the entire open front side of the enclosure and the sliding insert snugly engages the meter and said gasket and closes the opening in the cover around the meter, and then attaching the lower end of the cover to the enclosure.

3. In combination with an enclosure for a socket meter, said enclosure having an open front side with an angular flange overhanging the upper end thereof, a cover for the open side of the enclosure, said cover being in the form of a flat sheet of such size and shape as to completely cover the open front side of said enclosure, the upper end of said cover being engaged under said overhanging flange of the enclosure, cooperating hasps upon the lower end of the cover and the lower end of the enclosure for attaching the lower end of the cover to the enclosure, there being a circular opening in the cover of larger diameter than the socket meter, and an insert plate slidably mounted upon the inner side of the cover and having a circular opening therein of the same diameter as the socket meter, whereby the cover may be placed upon the enclosure by positioning the cover in a plane parallel to the open front side of the enclosure with the meter inserted through the circular opening in the insert plate and the upper edge of the opening in the cover in close proximity to the meter, then moving the cover flat against the open front side of the enclosure, then sliding the cover upwardly relative to the sliding insert, upon the open front side of the enclosure to engage the upper end of the cover under said overhanging flange so that the cover closes the entire open front side of the enclosure and the sliding insert snugly engages the meter and closes the opening in the cover around the meter, and then latching said cooperating hasps together for attaching the lower end of the cover to the enclosure.

References Cited in the file of this patent

UNITED STATES PATENTS

| | | |
|---|---|---|
| 2,329,349 | Johansson | Sept. 14, 1943 |
| 2,412,558 | Blank | Dec. 17, 1946 |